United States Patent [19]
Alger et al.

[11] Patent Number: 5,315,610
[45] Date of Patent: * May 24, 1994

[54] SYSTEM FOR CONTROLLING THE FLOW OF GAS INTO AND OUT OF A GAS LASER

[75] Inventors: Terry Alger, Tracy; Dennis M. Uhlich; William J. Benett, both of Livermore; Earl R. Ault, Dublin, all of Calif.

[73] Assignee: The United States of America as represented the the Unites States Department of Energy, Washington, D.C.

[ * ] Notice: The portion of the term of this patent subsequent to Aug. 24, 2010 has been disclaimed.

[21] Appl. No.: 911,189

[22] Filed: Sep. 22, 1986

[51] Int. Cl.[5] .................................. H01S 3/00
[52] U.S. Cl. ........................... 372/55; 372/58; 372/59; 372/61; 372/63
[58] Field of Search ............. 372/55, 58, 59, 61, 372/63; 330/4.3

[56] References Cited

U.S. PATENT DOCUMENTS

| | | | |
|---|---|---|---|
| 3,424,997 | 1/1969 | Lopez et al. | 372/59 |
| 3,605,038 | 9/1971 | Byrne | 372/55 |
| 3,676,797 | 7/1972 | Kovacs | 372/55 |
| 3,789,320 | 1/1974 | Hepburn | 372/58 |
| 3,970,957 | 7/1976 | Regan | 372/58 |
| 3,982,200 | 9/1976 | Hoag et al. | 372/55 X |
| 4,068,196 | 1/1978 | Hohla et al. | 372/58 |
| 4,584,689 | 4/1986 | List et al. | 372/55 |
| 4,612,642 | 9/1986 | Whitney et al. | 372/55 X |

*Primary Examiner*—Mark Hellner
*Attorney, Agent, or Firm*—Miguel A. Valdes; Henry P. Sartorio; William R. Moser

[57] ABSTRACT

A modularized system for controlling the gas pressure within a copper vapor or like laser is described herein. This system includes a gas input assembly which serves to direct gas into the laser in a controlled manner in response to the pressure therein for maintaining the laser pressure at a particular value, for example 40 torr. The system also includes a gas output assembly including a vacuum pump and a capillary tube arrangement which operates within both a viscous flow region and a molecular flow region for drawing gas out of the laser in a controlled manner.

11 Claims, 3 Drawing Sheets

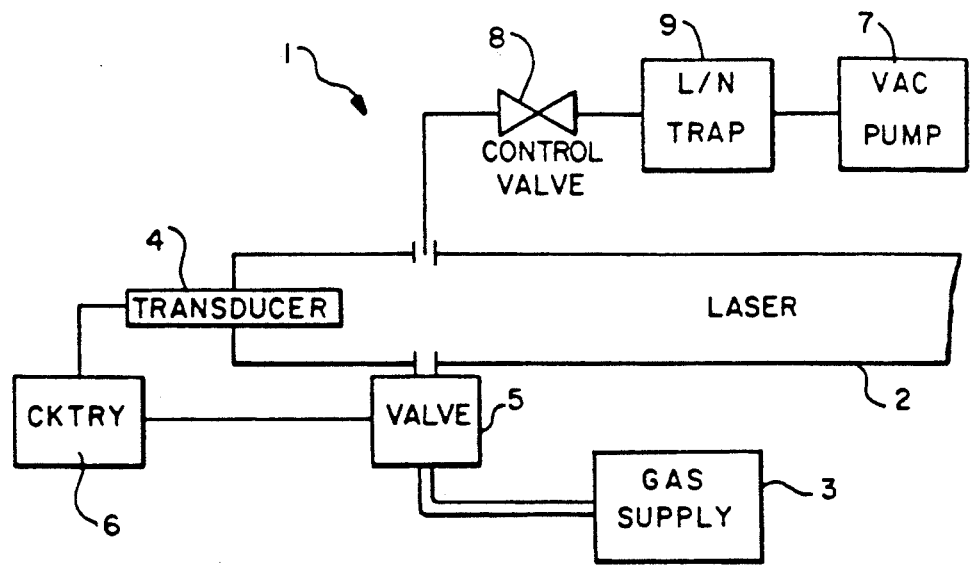
FIG.—1
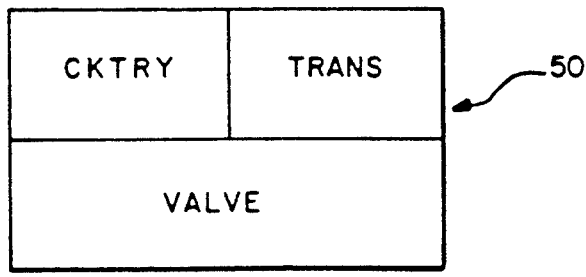
FIG.—2
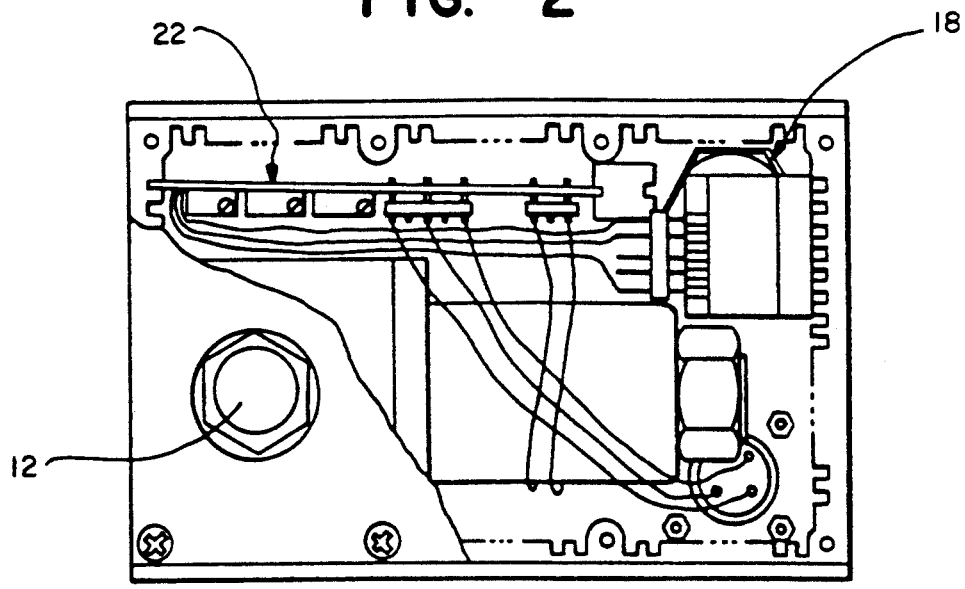
FIG.—3

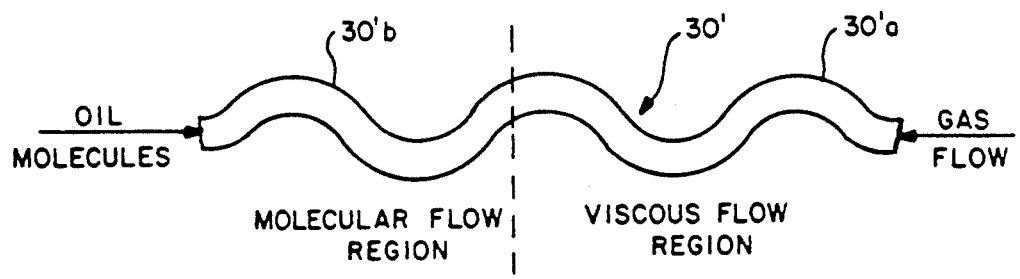
FIG.—6A
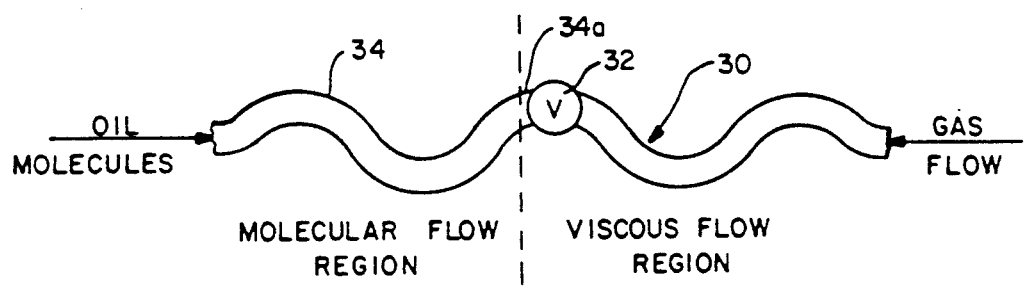
FIG.—6B
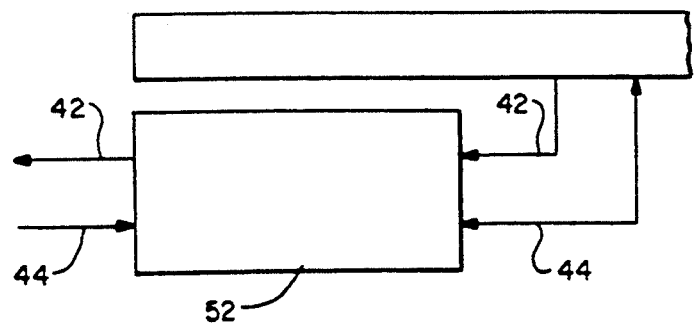
FIG.—7

SYSTEM FOR CONTROLLING THE FLOW OF GAS INTO AND OUT OF A GAS LASER

FIELD OF THE INVENTION

The U.S. Government has rights in this invention pursuant to a contract number W-7405-ENG-48 between the U.S. Department of Energy and the University of California for the operation of the Lawrence Livermore National Laboratory.

BACKGROUND OF THE INVENTION

The present invention relates generally to the operation of gas lasers such as copper vapor lasers and more particularly to a system for controlling the flow of gas into and out of such lasers.

The gas laser such as a copper vapor laser requires a continuous in flow and out flow of gas, as exemplified diagrammatically in FIG. 1 which illustrates a typical copper vapor laser system. This system which is generally indicated by the reference numeral 1 is shown including an arrangement of components for causing neon gas to flow into and be leaked out the laser, which is generally indicated by the reference numeral 2, in a controlled manner so as to maintain the pressure within the laser at a particular level, for example 40 torr. The specific components utilized to control the gas flow into the laser include a supply of neon gas generally indicated at 3, a suitable and readily providably transducer 4 for sensing the pressure within the laser, an inlet valve 5 and readily providably control circuitry which is generally indicated at 6. The transducer, upon sensing the pressure within the laser, provides a corresponding signal which is utilized by circuitry 6 to control valve 5 in the appropriate manner. If the pressure within the laser is below the desired level, the valve is caused to increase the gas flow therein and if the pressure within the laser rises, the valve is caused to decrease the flow.

Thus far, only those components of system 1 which serves to control the flow of neon gas into laser 2 have been described. The components utilized to control the flow of gas out of the laser include a vacuum pump 7 and a control valve 8. The vacuum pump serves to draw the gas out of the laser through the control valve and the latter functions as a constriction device between the laser and pump. This constriction device serves to provide a relatively large drop in pressure between the laser and vacuum pump, for example a drop in pressure from 40 Torr to 1 Torr, while maintaining a constant gas flow rate over that drop in pressure, for example a flow rate of 10 sccm. In that way, a relatively low pressure vacuum pump can be utilized, for example one which operates at 1 torr or less.

The typical system just described has the advantage that it can utilize a relatively low pressure pump. However, the use of such a pump results in a particular problem associated with reverse molecular flow. Specifically, when vacuum pump 7 operates at low pressure, for example on the order of 1 torr or less, it operates within the molecular flow regime or region. As a result, molecules are able to flow upstream as well as downstream. Thus, it is possible for oil molecules from the vacuum pump to diffuse back into the laser system. In order to prevent this from occurring, a typical system of the type illustrated in FIG. 1 has been provided with a liquid nitrogen (L/N) trap between the vacuum pump and laser, as generally indicated by the reference numeral 9 in FIG. 1. This trap utilizes liquid nitrogen to condense the reverse flow oil within a cooperating trap, thereby preventing it from going any farther back into the system. While such a trap functions in the intended manner, it has a disadvantage of specialized maintenance and handling required plus high vacuum required to keep liquid nitrogen losses low and relatively large.

SUMMARY OF THE INVENTION

In view of the foregoing, it is an object of the present invention to provide a system for controlling the flow of gas into and out of a gas laser, which system utilizes a low pressure vacuum pump operating within the molecular flow region but which prevents reverse molecular flow without resorting to the use of a liquid nitrogen trap.

A more particular object of the present invention is to provide a technique for preventing reverse molecular flow solely my means of a constriction technique, that is, by means of structure alone rather than using chemicals such as liquid nitrogen.

Another particular object of the present invention is to insure against reverse molecular flow in the event that the entire laser system goes down.

A further object of the present invention is to provide a modularized system for controlling the flow of gas into and out of a laser.

As will be seen hereinafter, the overall system for controlling the flow of gas into an out of a gas laser, specifically a copper vapor laser, is disclosed herein. This system includes a first assembly for controlling the flow of gas into the laser and a second assembly for controlling the flow of gas out of the laser. In accordance with one aspect of the present invention, both of these assemblies form part of a single module. The first or gas in-flow assembly includes its own inlet valve, transducer and circuitry physically within the module and the second or gas out-flow assembly includes its own vacuum pump physically within the module.

The second or gas out-flow assembly includes conduit means extending between the laser and vacuum pump and cooperating with the latter for drawing gas out of the laser. In accordance with a second feature of the present invention, this gas out-flow assembly also includes a capillary tube arrangement in the flow line of the conduit means between the laser and vacuum pump and serves as a flow constriction for dropping the pressure to a sufficiently low level such that the low pressure vacuum pump operating in the molecular flow region can be utilized. At the same time, the capillary tube arrangement is configured so as to include an upstream section operating in the viscous flow region and a downstream section operating in the molecular flow region. In a preferred embodiment, a shut-off valve is provided within the upstream section defining the viscous flow region.

Additional objects, advantages and novel features of the invention will be set forth in the description which follows, and in part will become apparent to those skilled in the art upon examination of the following or may be learned by practice of the invention. The objects and advantages of the invention may be realized and attained by means of the means of the instrumentalities and combinations particularly pointed out in the appended claims.

BRIEF DESCRIPTION OF THE DRAWINGS

The overall system just discussed briefly will be described in more detail hereinafter in conjunction with the drawings wherein:

FIG. 1 is a diagrammatic illustration of a typical prior art system for controlling the flow of gas into and out of a gas laser such as a copper vapor laser;

FIG. 2 diagrammatically illustrates a module forming part of a system designed in accordance with the present invention for controlling the flow of gas into and out of a gas laser;

FIG. 3 is a partially broken away plan view of the last mentioned system in accordance with an actual working embodiment of the present invention;

FIG. 6a diagrammatically illustrates a capillary tube arrangement which forms part of the system of FIGS. 3-5 and which is designed in accordance with a first embodiment of the present invention;

FIG. 6b diagrammatically illustrates a capillary tube arrangement which is designed in accordance with a second embodiment of the present invention; and FIG. 7 is a block diagram of the overall system of the present invention.

DETAILED DESCRIPTION OF THE INVENTION

Figure 4:
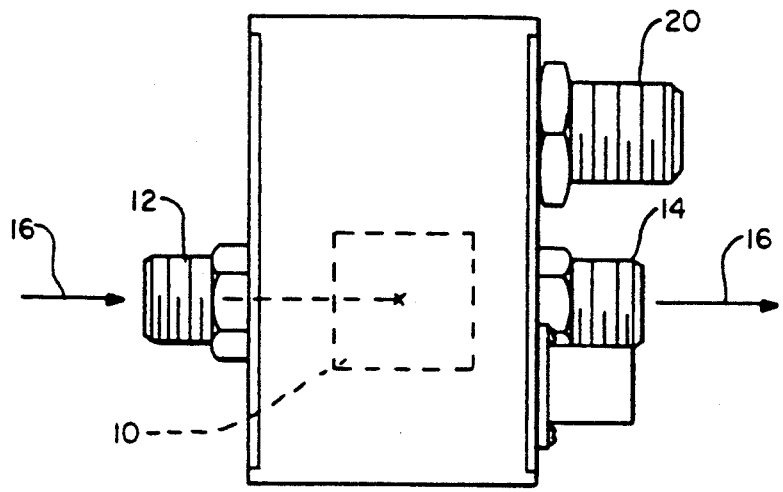
FIG. 4 is a side elevational view of the system illustrated in FIG. 3.

Reference will now be made in detail to two preferred embodiments of the present invention, examples of which are illustrated in the accompanying drawings. While the invention will be described in connection with these preferred embodiments, it will be understood that it is not intended to limit the invention to those embodiments. On the contrary, it is intended to cover all alternative modifications and equivalents, as may be included within the spirit and scope of the invention and defined by the appended claims.

Turning now to the drawings, wherein like components are designated by like reference numerals, attention is first directed to FIG. 2. This figure diagrammatically illustrates what may be referred to as a sub-module 50 containing all of the components necessary to control the flow of gas into the gas laser from a suitable supply. This supply may be the same supply 3 illustrated in FIG. 1. The laser itself is shown in FIG. 5 at 26. The components making up the overall assembly within the sub-module include an inlet valve 10, a pressure transducer 18 and suitable and readily providable control circuitry 22, all of which are indicated by the respective reference numerals in FIGS. 3-5 to be discussed below. The transducer, inlet valve and electronic circuitry function together to control the flow of gas into the laser, as just stated. In addition, as will be seen hereinafter, this sub-module forms part of a large module which also includes the previously recited vacuum pump and a capillary tube arrangement which is designed in accordance with the present invention to eliminate the liquid nitrogen trap 9 forming part of system 1 illustrated in FIG. 1. The vacuum pump and capillary tube arrangement are shown in FIG. 5 at 24 and 25, respectively.

Figure 5:
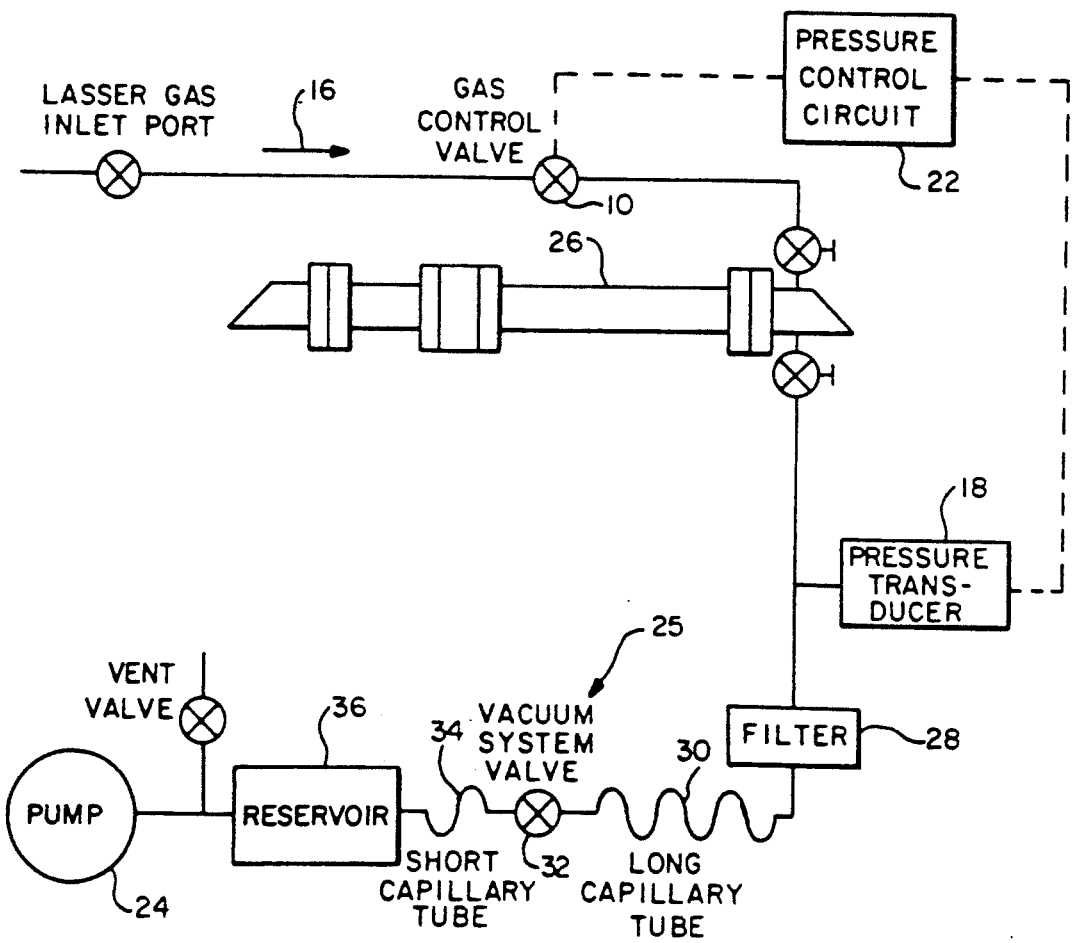
FIG. 5 diagrammatically illustrates the system of the present invention and the way the system functions.

FIGS. 3 and 4 illustrate an actual working embodiment of sub-module 50 shown in FIG. 2. This sub-module includes inlet valve 10 as well as an inlet port 12 and an outlet port 14. In addition, arrows 16 represent gas flow into the laser and the pressure transducer 18 is shown including its own port 20 which is physically placed in communication with the internal pressure of the laser. Finally, the control circuitry is shown at 22, as indicated above.

The various components making up the overall sub-module 50 in FIGS. 3 and 4 are shown in detail in FIG. 5 which, as stated above, diagrammatically illustrates an overall control system designed in accordance with the present invention. This system is shown including valve 10, transducer 18, circuitry 22 and vacuum pump 24. The vacuum pump, like vacuum pump 7 forming part of system 1 in FIG. 1, serves to draw gas out of the laser 26. The gas is drawn through a suitable filter 28, capillary tube arrangement 25, a reservoir 36 which will be discussed below and finally through the vacuum pump 24 to the ambient surroundings. Suitable conduit means connect these various components in the flow path of the gas between laser 26 and pump 24.

In accordance with the present invention, capillary tube arrangement 25 includes an upstream, primary capillary tube 30 and a downstream, secondary capillary tube 34 with a vacuum system valve 32 therebetween. The capillary tubes serve two purposes. First, they are designed to reduce the pressure within the flow path between laser 26 and pump 24 a substantial amount, for example from 40 torr to 1 torr or less, so that a small vacuum pump can be used, as described in FIG. 1. In otherwords, the upstream side of the capillary tube arrangement, that is, the upstream side of capillary tube 30, operates at a pressure within the laser, for example 40 torr, and the downstream side of the arrangement, that is, the downstream side of capillary tube 34, operates at the pressure of pump 24, for example, one torr or less. At the same time, even though the pressure at pump 24 is sufficiently low to be within the molecular flow region, the capillary tubes keep the line immediately upstream of the pump in viscous flow, that is, in a state where the molecules are still interacting with each other so as to push in the flow direction. Stated another way, the capillary tubes provide sufficient flow in the gas flow direction, i.e., towards the vacuum pump, so as to insure that oil from the vacuum pump does not inadvertently diffuse back into the laser. As a result, it is not necessary to use a liquid nitrogen trap which, as stated previously, it has the disadvantage that it is relatively large and that it requires the use of liquid nitrogen.

Overall capillary tube arrangement 25 has been described above as including two capillary tubes and a vacuum system valve. The advantage of these components will be discussed below. However, it should be noted that the overall arrangement could consist of a single capillary tube if it is long enough. Specifically, the capillary tube must be sufficiently long to include a viscous flow region along the high pressure side as well as a molecular flow region on the low pressure side, as exemplified in FIG. 6a by the single capillary tube 30'. It should be noted that this tube includes an upstream section 30'a which is within the viscous flow region of the pressure drop and a downstream section 30'b which is within the molecular flow region of the pressure drop. As a result, as oil molecules from the vacuum pump side (e.g., the low pressure side) start to travel up the capillary tube towards the laser, they will eventually reach the viscous flow region (at a certain higher pressure point along the tube), at which time these molecules will be pushed forward with the gas flow back towards the vacuum pump.

One possible drawback in utilizing a single capillary tube may occur when the entire system is shut down, that is, when the gas within the capillary tube ceases to flow. Under these circumstances, with no forward gas flow through the capillary tube, the viscous flow region disappears, thereby making it possible for oil molecules in the molecular flow region of the tube to flow entirely back through the tube and into the system. In accordance with a preferred embodiment of the present invention, the capillary tube arrangement is comprised of the two capillary tubes 30 and 34 illustrated in FIG. 5 with a vacuum system valve 32 therebetween. These two tubes are illustrated in FIG. 6b in relation to the molecular flow region and the viscous flow region. Note specifically that tube 30 is entirely within the viscous flow region, that is, tube 30 produces a pressure drop which is entirely within the viscous flow region. At the same time, tube 34 is mostly within the molecular flow region but includes an upstream segment 34a which is in the viscous flow region. Stated another way, the pressure drop defined by tube 34 is such that it only falls within the molecular flow region after passing through section 34a. It should also be noted that vacuum system valve 32 is disposed entirely within the viscous flow region, that is, both its upstream end and its downstream end are within that region and not within the molecular flow region. This arrangement insures that there will be no back flow when this system is shut off. The reason for this is as follows. When the system shuts down, the valve 32 is caused to automatically close. As a result, even though the viscous flow region of tube 30 and section 34a of tube 34 disappears thereby allowing molecular flow in the direction of the laser, the molecular flow in that direction is stopped by shut-off valve 32. If the system is turned on and valve 32 is opened, the viscous flow region reappears preventing back molecular flow.

As indicated above, the overall system illustrated in FIG. 5 includes a reservoir 36. This reservoir serves to collect any large surge of back flow from oil within pump 24.

Turning now to FIG. 7, an overall module 52 representing the entire system is illustrated. This module includes a previously cited sub-module 50 shown in FIG. 2 as well as a vacuum pump 24, reservoir 36, capillary tubes 30, 34 and other associated components of the overall system. The arrows 42 in FIG. 6 correspond to the outflow of gas from the laser and the arrows 44 correspond to the inflow of gas into the laser.

The foregoing description of the preferred embodiment of the invention have been presented for purposes of illustration and description. They are not intended to be exhaustive or to limit the invention to the precise form disclosed, and obviously many modifications and variations are possible in light of the above teaching. The embodiments were shown and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What is claimed is:

1. An assembly for controlling the flow of gas out of a gas laser, comprising: a vacuum pump; conduit means extending between said laser and vacuum pump and cooperating with the latter for drawing gas out of said laser; and a capillary tube arrangement forming part of and located within a flow line of said conduit means between said laser and vacuum pump, said capillary tube arrangement being configured to function as a flow constriction within said line for dropping the pressure between said laser and pump sufficiently low to cause the pump to operate in the molecular flow region while the pressure within the laser is sufficiently high to operate in the viscous flow region, said capillary tube arrangement being sufficiently long so as to define an upstream section, flow wise, which operates within the viscous flow region and a downstream section, flow wise, which operates within the molecular flow region.

2. An assembly according to claim 1 wherein said capillary tube arrangement includes a shut-off valve located in the flow line of said conduit means entirely within the viscous flow region of said capillary tube arrangement section.

3. An assembly according to claim 2 including means for controlling the operation of said shut-off valve such that the latter is maintained in its opened state as gas is drawn through the upstream and downstream sections of the capillary tube arrangement and is closed when gas flow through the arrangement ceases, whereby to insure that the molecular flow region defined by said downstream section does not inadvertently extend into said upstream section.

4. An assembly according to claim 3 including a reservoir within the flow line of said conduit means between said pump and the downstream section of said tubular arrangement.

5. An assembly for controlling the flow of gas out of a gas laser, said assembly comprising; a vacuum pump; conduit means extending between said vacuum pump and said laser for drawing gas from said laser into the ambient surroundings; and a capillary tube arrangement in the flow line between said laser and vacuum pump and serving both as a flow constriction for dropping the pressure substantially between said laser and pump and as a means for preventing molecules such as the oil molecules from the vacuum pump from flowing back into the laser, said arrangement including a shut off valve, a primary capillary tube on the upstream side of said shut off valve and a secondary capillary tube on the downstream side of said valve, said secondary capillary tube being sufficiently long to include both the entire molecular flow region of the combined tubes and a part of the viscous flow region thereof.

6. An arrangement for controlling the flow of gas into and out of a gas laser, comprising;
 (a) a first assembly for controlling the flow of gas into said laser; and
 (b) a second assembly for controlling the flow of gas out of said laser, said second assembly including a vacuum pump, conduit means extending between said laser and vacuum pump and cooperating with the latter for drawing gas out of said laser, and a capillary tube arrangement in the flow line in said conduit means between said laser and vacuum pump, said capillary tube arrangement being configured to function as a flow constriction for dropping the pressure between said laser and vacuum pump such that an upstream section of said arrangement operates in the viscous flow region while a downstream section thereof operates within the molecular flow region.

7. A system according to claim 6 wherein said first and second assemblies form part of a single module.

8. A system according to claim 7 wherein said second assembly includes its own vacuum pump physically within the module.

9. A system according to claim 8 wherein said first assembly includes its own inlet valve, transducer and circuitry physically within the module.

10. A method of controlling the flow of gas out of a gas laser, comprising the steps of; providing a vacuum pump and conduit means between said pump and said laser; operating said vacuum pump at a sufficiently high level to draw gas out of said laser through said conduit means; and as said gas flows through said conduit means from said laser to said vacuum pump subjecting it to capillary action along a predetermined extent of its flow path sufficient to cause the pressure to drop in said extent from a pressure level which is within the viscous flow region to a pressure which is within the molecular flow region.

11. A method according to claim 10 including the step of closing the flow path of said gas within the viscous flow region of its flow path in the event that the flow of gas through said conduit means decreases for other reasons.

* * * * *